United States Patent [19]

Haas

[11] 4,019,206
[45] Apr. 19, 1977

[54] METHOD AND APPARATUS FOR MAGNETIC RECORDING OF DATA WITH A RECORDING HEAD HAVING A PLURALITY OF PHYSICALLY PARALLEL, SERIALLY CONNECTABLE CONDUCTORS

[76] Inventor: Peter Haas, 113 Richmond Ave., Ridgewood, N.J. 07450

[22] Filed: June 7, 1973

[21] Appl. No.: 367,738

Related U.S. Application Data

[63] Continuation of Ser. No. 178,694, Sept. 8, 1971, abandoned.

[52] U.S. Cl. .............................. 360/123; 346/741; 360/63
[51] Int. Cl.[2] .......................................... G11B 5/20
[58] Field of Search ............ 340/174.1 D, 174.1 F; 360/63, 123

[56] References Cited

UNITED STATES PATENTS

| | | | |
|---|---|---|---|
| 2,849,703 | 8/1958 | Bindow et al. ............. | 340/174.1 D |
| 2,926,298 | 2/1960 | Newhouse .................. | 340/174.1 D |
| 2,941,190 | 6/1960 | Lindley ...................... | 340/174.1 D |
| 3,098,216 | 7/1963 | Samwel ...................... | 340/174.1 D |
| 3,115,621 | 12/1963 | Slavin ........................ | 340/174.1 D |
| 3,119,095 | 1/1964 | Hansen ...................... | 340/174.1 D |
| 3,152,322 | 10/1964 | Lawrence ................... | 340/174.1 D |
| 3,182,298 | 5/1965 | Lawrence ................... | 340/174.1 D |

*Primary Examiner*—Vincent P. Canney
*Attorney, Agent, or Firm*—Davis, Hoxie, Faithfull & Hapgood

[57] ABSTRACT

Method and apparatus for recording data on a magnetic medium. A plurality of spaced physically parallel conductors are mounted on a mounting member and positioned in proximity to the surface of a magnetic recording medium. Means are included for selectively energizing the conductors in a series circuit comprising the selected conductors and alternative conducting means bypassing the non-selected conductors to record data on the magnetic medium.

11 Claims, 11 Drawing Figures

INVENTOR.
PETER HAAS
BY
Davis, Hoxie, Faithfull & Hapgood
ATTORNEYS

INVENTOR.
PETER HAAS

BY
Davis, Hoxie, Faithfull & Hapgood
ATTORNEYS

METHOD AND APPARATUS FOR MAGNETIC RECORDING OF DATA WITH A RECORDING HEAD HAVING A PLURALITY OF PHYSICALLY PARALLEL, SERIALLY CONNECTABLE CONDUCTORS

This is a continuation of application SER. NO. 178,694 filed Sept. 8, 1971 now abandoned.

The present invention relates to data recording. More specifically, the present invention relates to a method and apparatus for recording data onto a magnetic medium.

Generally, apparatus presently being utilized to record data employ a gap head construction and generally require expensive drive means for providing constant velocity movement of the magnetic medium past the head gap.

It is an object of the present invention to provide a simplified low cost method and apparatus for data recording.

It is a further object of the present invention to provide a method and apparatus capable of directly recording parallel data without requiring parallel-to-serial conversion circuitry.

It is still a further object of the present invention to provide a method and apparatus for recording data which can be readily employed with a positionable magnetic medium, such as a ferromagnetic recording wire or an iron oxide coated recording tape, card, drum disc or the like, when the magnetic medium is stationary to provide inexpensive data recording.

It is a further object of the present invention to provide a method and apparatus for recording data words on a moving magnetic medium, providing predetermined accurate recorded bit spacings which are substantially independent of the velocity and velocity variations of the magnetic medium.

Briefly, according to the method of the present invention, a plurality of conductors such as conductive wires are arranged in a spaced parallel relationship relative to one another and maintained in their relative relationship, each in proximity to portion of the magnetic medium. The conductors are selectively energized for recording data onto the magnetic medium.

Other objects, aspects and advantages of the present invention, in addition to the above described objects, will be more fully understood when the detailed description is considered in conjunction with the drawings, as follows.

Figure 1:
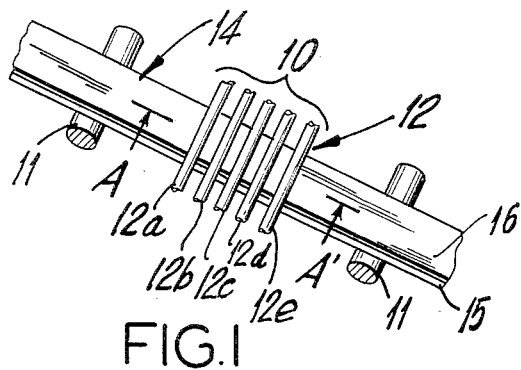
FIG. 1 is a schematic perspective view of a recording head and recording medium according to the present invention.
Figure 2:
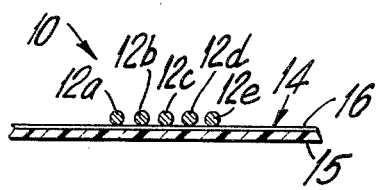
FIG. 2 is a cross-sectional view of the recording head of FIG. 1 along line AA'.

FIGS. 1 and 2 show schematically a plurality of parallel, equally spaced, fine gauge wires 12a, 12b, 12c, 12d and 12e each of which is arranged parallel to and in proximity to the magnetic recording medium, shown here as recording tape 14 comprising a plastic tape 15 to provide physical support and a coating 16 of a type used in magnetic recording, such as ferric oxide ($Fe_2O_3$). The wires 12a-e comprise the recording head 10. Tape support means shown as pins 11 support the tape in close proximity to or in contact with head 10.

Figure 3:
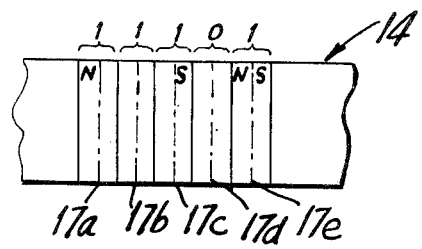
FIG. 3 is a schematic representation of the magnetic medium which has been magnetized with the binary number 11101 by the recording head of FIG. 1.

When current flows through selected wires 12 of the recording heat 10, the resulting magnetic fields about the energized wires line up the domains on each side of the wires, so that within some distance on each side of the energized wires 12 the magnetic tape 16 becomes magnetized resulting in the recording of data bits. If sufficiently high current is transmitted through two adjacent wires, e.g.: 12a, 12b and 12c, the areas of magnetic saturation will overlap. Such a magnetic record provides a non-return-to-zero (NRZ) data pattern. FIG. 3, for example, portrays the NRZ data pattern of the binary number 11101 where broken lines 17a-e represent the approximate location of wires 12a-e respectively during recording. The region of saturation extends in each case from the region indicated by N to the region indicated by S.

Figure 4:
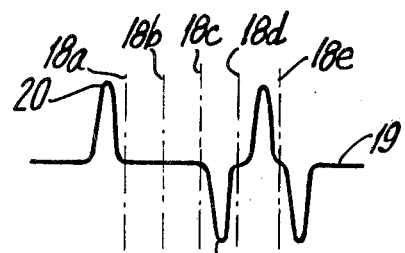
FIGS 4 and 5 are each an idealized representation of the oscilloscope pattern which would be produced upon playback of the binary number 11101 recorded by the NRZ and RZ techniques respectively.

During playback of the tape 16 on a conventional playback unit having a gap type head, an oscilloscope (not shown) monitoring the output voltage waveform shows a pulse of one polarity at the commencement and a pulse of opposite polarity at the end of the data recording between the locations of consecutively energized wires 12, with a period of no induced or zero voltage between the leading and lagging edges of the waveform of successive data bits on the magnetic tape 16. For example, FIG. 4 shows an idealized waveform 19 of the NRZ data pattern of the binary number 11101. Broken lines 18a-e indicate the points on the waveform corresponding to the approximate respective locations of wires 12a-e during recording.

The NRZ signal recorded onto a magnetic medium by the NRZ apparatus and method of the present invention is not the conventional square wave NRZ signal of the type used with teletype equipment and the like. As indicated in FIG. 4 the region of positive state in the NRZ signal recorded onto the magnetic medium according to the present invention is defined by a positive pulse, e.g.: 20 and the subsequent negative pulse, e.g.: 21. This form of recorded signal can easily be converted to the conventional square wave NRZ signal and simultaneously amplified to a level sufficient to drive an ASR33 teletype machine input or the like, by the circuit shon in FIG. 11, described below.

Figure 5:
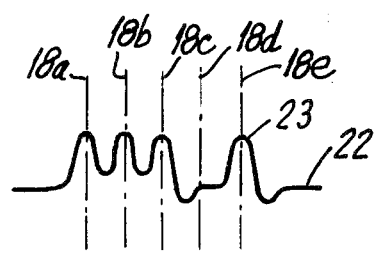

If the current transmitted through adjacent wires 12 is reduced below the minimum necessary for NRZ recording, e.g., to approximately one-half of its minimum overlapping saturation value, the adjacent fields of magnetic saturation do not overlap. The result is a recorded return-to-zero (RZ) data pattern which produced a playback waveform in which the amplitude of the data pulses returns to near zero amplitude after the recording of each data bit. The amplitude may move past zero to the opposite polarity at the end of the last sequential data pulse. FIG. 5 shows an idealized playback waveform 22 of a RZ data pattern of the binary number 11101. Broken lines 18a–e indicate the points on the waveform corresponding to the approximate respective locations of wires 12a–e during recording. RZ recording advantageously requires only unipolar signal processing and provides more timing reference transitions in the data pattern which facilitates data detection during playback. A spacing between wires of at least one wire diameter is preferred, particularly in the case of a head 10 for use in RZ recording.

The data bit waveforms produced during playback have a peak amplitude, as indicated, for example, at 23 in FIG. 5. These peak signals are characterized by a change in the sign of the slope of the waveform. This change in sign of the slope readily facilitates retrieval of the data by providing a reference point for the generation of synchronized timing pulses in conventional fashion.

The magnetic tape 16 may be advantageously prerecorded, using equipment having minimal velocity fluctuations, with a periodic waveform such as a sine wave to provide a clock track. When current passes through the wires 12 a number of cycles of the prerecorded sine wave are partially erased or obliterated from the clock track, producing an amplitude modulated RZ data signal. The data may be recovered by moving the recorded tape 16 past a conventional playback head and feeding the amplified amplitude modulated RZ data signal to both a conventional AM detector, which will produce the serial RZ data at its output, and a clipper or squaring circuit, which will produce the clock pulses. By determining the number of sine wave cycles as measured from the leading edge or center of a start bit, it therefore is possible to retrieve and store information contained in the subsequent data bits on the magnetic tape 16 by conventional techniques.

Figure 6:
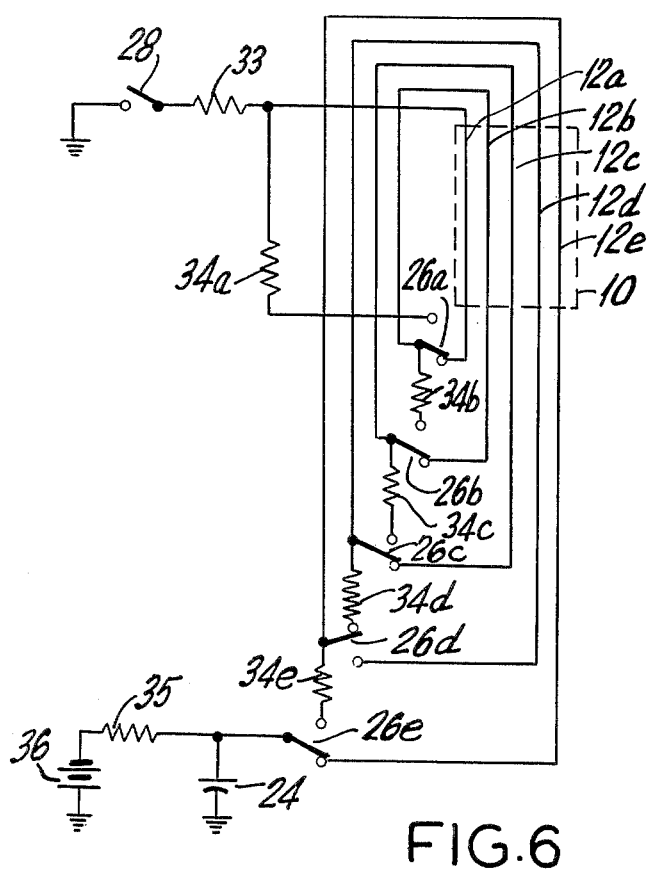
FIG. 6 is a schematic diagram of a recording circuit in accordance with the present invention.

Referring to FIG. 6, the wires 12a–e of wire recording head 10 are selectively energized with current from a current source, e.g.: by the discharge of a capacitor 24 through the selected wires of recording head 10. Individual data source switches, e.g., double pole single throw switches 26a–e, are electrically connected with each wire 12a–e respectively and interconnected with one another to provide a series circuit for steering or directing current through the wires selected by the positions of the poles of data source switches 26a–e. The control switch 28, which may also advantageously be a relay or solid state device, is in series with the recording head 10 and the capacitor 24. The control switch 28 is used to initiate the flow of current from the capacitor 24 through the selected wires of the recording head 10. When capacitor 24 (e.g.: 100 microfarads) is charged, current may then be discharged through the selected wires 12 by closing control switch 28. The position of the data source swiches 26a–e selects the respective wires through which the current will flow and thereby determines the recorded data bit pattern. As shown in FIG. 6, when a typical data source switch 26e is thrown down, current flows through the associated wire 12e; when the data source switch 26e is thrown up, the associated wire 12e is open-circuited and no current flows through it. The positions of the data source switches 26 in FIG. 6 are those for the binary number 11101. Upon the closing of control switch 28, current can flow from the capacitor 24 via switch 26e through wire 12e. The current is then diverted from switch 26d to the rotor of switch 26c, without flowing through wire 12d. From switch 26C, the current flows successively through wire 12c, switch 26b, wire 12b, switch 26a and wire 12a and then through resistor 33 and switch 28 to the other terminal of the capacitor 24 via ground.

Improved uniformity of recording is obtained by the use either (1) of a small resistor 33 (e.g.: 2 ohms) which is sufficiently larger than the series resistance of wires 12 to reduce the percentage variation of current between the case in which the capacitor 24 is discharged through all five wires 12 and the case in which the capacitor 24 is discharged through only one wire or (2) of very small resistances 34a–e one in each of the circuits bypassing wires 12a–e respectively, the resistances 34a–e having a value approximating that of its respective bypassed wire 12a–e. Resistances 34a–e may be conveniently formed by wires similar in material, length and cross-section to wires 12a–e. It is advantageous for each of the individual wires 12a–e to be of approximately the same material, length and cross-section as the others in order to equalize their resistance and provide equal magnetic field intensity about each of the energized wires.

The use of a capacitor 24 as a current source in the circuit of FIG. 6 provides several advantages. The switch 28 can be a simple mechanical switch, since the discharge of capacitor 24 is of short duration and is completed before switch contact bounce could cause any problems. Capacitor 24 can be trickle charged with current through a resistor 35 from a power source such as a battery 36. Since the trickle charge current can be several orders of magnitude lower than the capacitor discharge current used for recording, there need be no rigorous limitation on the duration of closure of the switch 28 to prevent smear of recorded information on a moving magnetic recording medium. Finally, the combination of low duty cycle and high peak current provided by the discharge of a capacitor permits the use of closely spaced small diameter conductors 10 for recording without overheating or melting the conductors 10. Alternatively, a current source can be substituted for the capacitor 24 and a transistor switching circuit having a suitably short "on" time can be substituted for the switch 28.

The recording head 10 may be used with a stationary medium such as tape 14, thereby eliminating the need to control wow or flutter of the tape drive means. A conventional indexing means, such as a stepping motor with a capstan tape drive, may be employed to move adjacent unrecorded portions of the tape 14 into position adjacent head 10 after recording on a given portion. The recording head 10 may also be advantageously employed to record on moving tape with little or no elongation of recorded bits and no degredation of bit spacing accuracy within each data word, as a result of the short duration of the data pulses, e.g.: on the order 1 to 100 microseconds when capacitor discharge recording is used, and the simultaneous recording of all bits in each data word.

Figure 7:
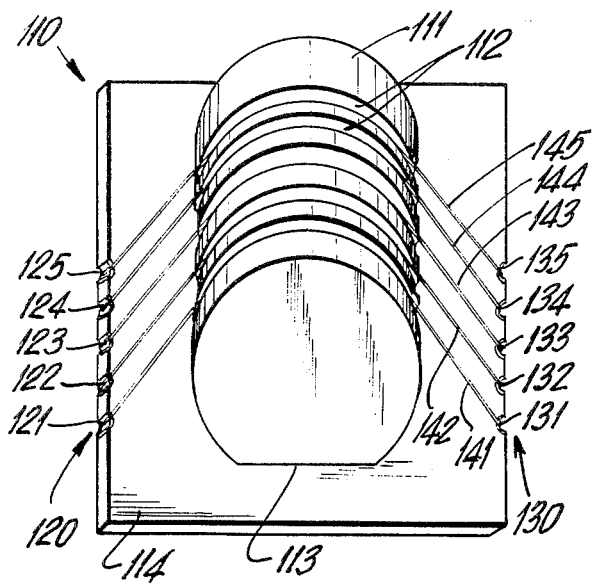
FIG. 7 is a perspective view of one embodiment of a recording head in accordance with the present invention.
Figure 8:
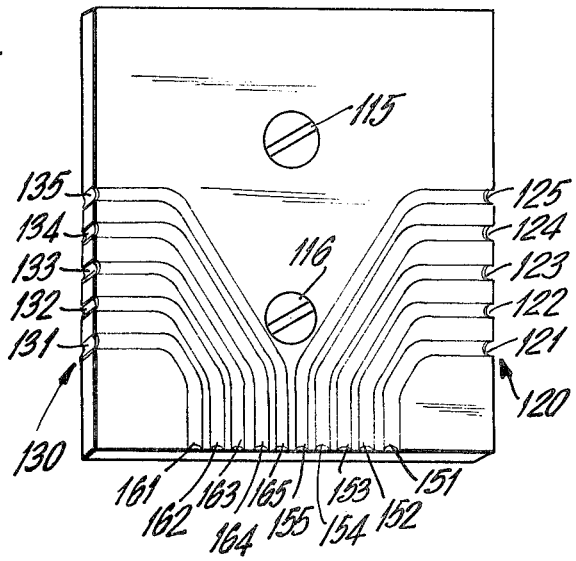
FIG. 8 is a plan view of the reverse side of the printed circuit board of the recording head of FIG. 7.
Figure 9:
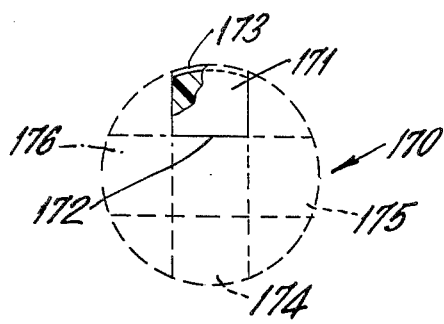
FIGS. 9 is a cross-sectional view of a rod which may be used for the core of a recording head in accordance with the present invention.

A recording head 110, suitable for use as the recording head 10 discussed above, can be constructed as shown in FIGS. 7 and 8, an discussed below. A ⅜-inch diameter polyvinyl chloride (PVC) rod 111 is cut to ½-inch long. Using a lathe, screw-machine or the like, a spiral groove 112 having a pitch of 0.0075 inch is cut on the surface of the rod 111. A flat 113 ¼-inch wide is then cut on one side of the rod 111 parallel to the rod's axis. Two spaced holes (not shown) are drilled into the rod 111 from the flat 113 and tapped for a convenient screw thread size. The rod 111 is then placed with its flat 113 against a support board 114, which may be a printed circuit board, and attached to the board by screws 115 and 116 passing through the board into the threaded holes in the rod 111. The board 114 has two rows 120 and 130 of notches 121–125 and 131–135 having a metallized surface, one row on either edge on opposite sides of the rod 111. Number 40 gauge copper wires 141–145, having a diameter of approximately 0.0031 inch, are run from each of the notches in row 120 over the rod 111 in a grove to the corresponding notch in the other row 130, without crossing the wires and, in the usual case, placing the wires in adjacent grooves (for devices which are to always record data patterns with certain fixed unequal spacings of bits, it may be desirable to vary the spacing of the wires accordingly, for example, by not placing a wire in one or more grooves between other wires). The wires 141–145 may be conveniently placed in position by continuously winding a single wire, for example, from a notch 121 at one end of row 120 across rod 111 through a groove and through the corresponding notch 131 at the end of row 130, then up through the adjacent notch 132 in row 130 across the rod 111 through the next groove to the corresponding notch 121 in row 120, etc. After winding the wire is secured at each of the board notches, for example by soldering the wire to the metallized surface of the board notches, an is then cut into individual wires 141–145 which are connected into the associated circuit, such as the circuit shown in FIG 6.

The connection of the individual wires 141–145 to the associated circuitry may be readily accomplished by the use of printed circuitry on the reverse side of the support board 114. Conductors 151 through 155 and 161 through 165 run from the metalized inner surface of the notches 121 through 125 and 131 through 135, respectively, to one or more edges of the board 114, where the conductors are suitably spaced for connection to one or more conventional printed circuit board edge connectors. The conductors may be formed on the board 114 in the conventional fashion, e.g.: by selective etching of a copper laminate on an electrically insulating board or by silk-screen printing of the conductive patterns onto the board 114.

A more compact recording head, suitable for use as the recording head 10, can be constructed by using a rod 171 instead of the rod 111 previously described. As indicated by solid lines in FIG. 8, rod 171 having grooves 173 is one segment of a ½-inch diameter cylindrical PVC rod 150 which has been grooved in the manner described for rod 111. The rod 171, cut from a ½-inch diameter rod, has a ⅛-inch cross-section and a grooved, cylindrical surface on one side. The rod 171 may be attached to a board or other support from the face 172 opposite the cylindrical surface or from one of the ends or the other faces, and used in the same manner as rod 111 described in connection with FIG. 7.. The phantom outline in FIG. 8 indicates that three other segments 174, 175 and 176 may also each be made into a rod similar to rod 171 from a single length of cylindrical rod.

Figure 10:
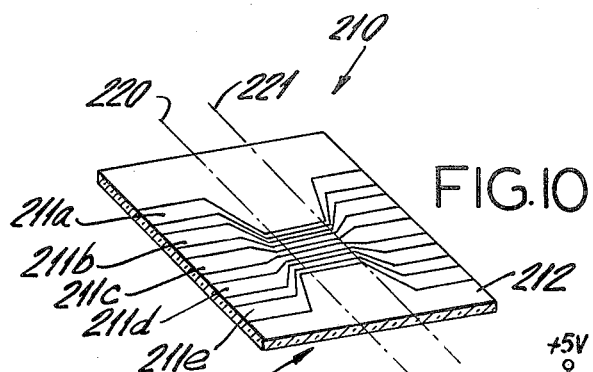
FIG. 10 is a perspective view of a printed circuit recording head in accordance with the present invention.

FIG. 10 illustrates an alternative embodiment of recording head 210 in which the conductors 211a–e employed for recording are deposited on an electrically insulating substrate 212. The particular embodiment shown in FIG. 10 is designed for use with magnetic recording tape, which is placed against the head 210 with the tape's longitudinal dimension transverse to the conductors 211a–e in the region between lines 220 and 221, where the conductors are closely spaced. At the outer edges of the substrate 212, the ends of the conductors 211a–e are suitably spaced and located for connection to conventional printed circuit board edge connectors, or alternatively may be spaced suitably for connection to a lead frame of the type used for a conventional dual in-line integrated circuit package.

In order to assure uniform dimensions and resistance of the conductors 211a–e, the conductors are screen-printed or deposited onto a smooth surfaced ceramic substrate 212, for example by one of the techniques employed in the manufacture of hybrid integrated circuits. A layer of glass 230 or other hard insulator may be deposited over the substrate 212 and conductors 211a–e by techniques known in the semiconductor device industry, to protect the conductors 211 from abrasion by the magnetic recording medium.

Figure 11:
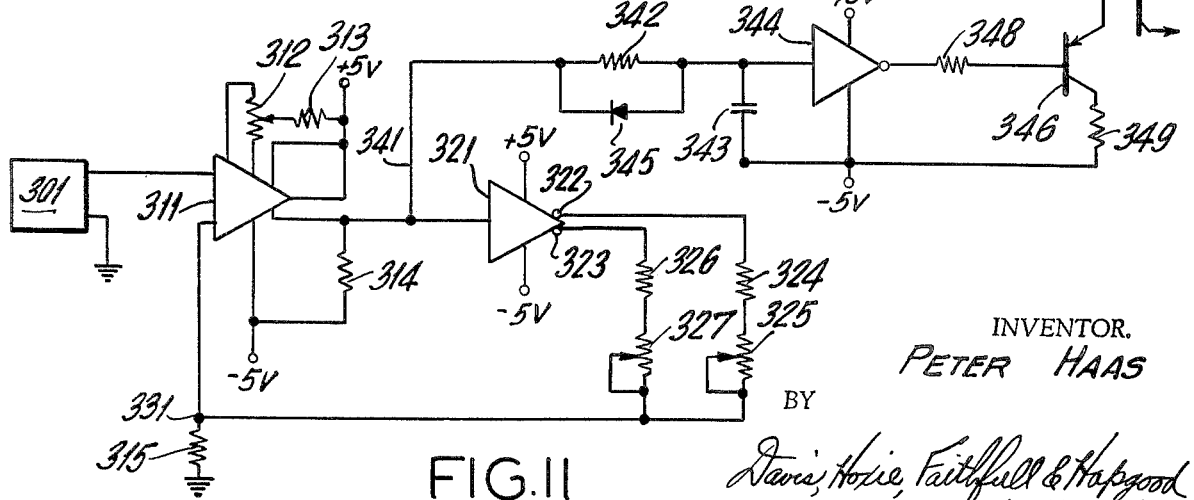
FIG. 11 is a schematic block diagram of a NRZ playback circuit for use in accordance with the present invention.

FIG. 11 shows a playback circuit suitable for conversion of the NRZ signal recorded in the fashion described in connection with FIG. 4 into a conventional NRZ signal suitable for driving an ASR-33 teletypewriter and equipment having similar signal input requirements. The playback circuit is characterized by the fact that it exhibits hysteresis; in other words the amplitude of the voltage at which triggering occurs depends upon whether the voltage is increasing or decreasing.

A conventional gap type playback head 301 is arranged so that the magnetic medium (not shown) is moved past the gap in conventional fashion, producing a signal having an amplitude, for example, of 20 millivolts peak-to-peak. This signal is applied to one input of differential amplifier 311, which may be a National Semiconductor type LM311 voltage comparator. The other input of the amplifier 311 is connected to a resistor 315 to ground and to a feedback signal from resistors 325 and 327. Conventional offset balancing adjustment is provided by the network comprising potentiometer 312, having its full resistance connected between the balance connections (pins 5 and 6 of the type LM311 in a TO-5 package) of amplifier 311, and resistor 313 which connects the arm of the potentiometer 312 to the positive voltage source (+5V). The output of the amplifier 311 is coupled in the negative-referred load mode, in which the output signal is generated across a resistor 314 connected from the emitter follower output terminal (pin 1) of amplifier 311 to the negative voltage source (−5V). In this mode, the output stage collector terminal (pin 7) is connected to the positive voltage source (+5V).

The output of amplifier 311 is applied to the input of a complementary pair 321 of complementary symmetry metal-oxide-semiconductor (COS/MOS) field effect transistors such as one of the complementary pairs in the RCA type CD4007A integrated circuit.

The output of amplifier 311 will always be either −5V or +5V. When the −5V is applied to the input of the complementary pair 321, the signal at the first output 322 of the pair 321 will be +5V in series with the "on" resistance of the first transistor of the pair 321, typically 1,000 ohms. The second output 323 of the pair 321 will produce no output signal, the output 323 then having a very high resistance of at least several megohms which is the "off" resistance of the second transistor of the pair 321. When +5V is applied to the input of pair 321, the signal from the second output 323 will be −5V in series with the "on" resistance and the first otput 322 will produce no output signal, having the "off" resistance of the first transistor of the pair 321, which is several megohms.

When the first output 322 is providing a plus 5V output current flows through resistor 324 and adjustable resistor 325 and thence to ground through resistor 315. Similarly, when the second output 323 is "on" and providing a −5V signal, current flows through resistor 326 and adjustable resistor 328 and thence to ground through resistor 315. The adjustable resistors 325 and 327 are to provide signals of +5 millivolts and −5 millivolts at point 331 when output 322 and 323 are "on" respectively. Point 331 is connected to the second input of amplifier 311.

When the input signal from head 301 exceeds the positive threshold of the amplifier 311, +5mV, the output of amplifier 311 switches from −5V to +5V, causing one transistor of pair 321 to turn off and the other to turn on, causing −5mV to appear at point 331. As a result, when an NRZ signal of the type shown in FIG. 4 provides a pulse of greater than +5mV and returns to 0 volts after a pulse, the output of amplifier 311 switches to and remains switched to +5V. When a negative signal from the head 301 exceeds the negative threshold of amplifier 311, −5mV, the output of amplifier 311 is switched to and remains at −5V, causing +5mV to appear at 331. The output of amplifier 311 remains +5V until the signal from the head exceeds +5mV.

The output of amplifier 311 is connected by lead 341 to a distortion correction circuit. This circuit compensates for the difference between the duration of the NRZ signal produced at the output of amplifier 311 and the duration of corresponding signals in the standard NRZ system employed in teletypewriters and the like. This compensation is accomplished by delaying the switching "on" of a bistable circuit such as COS/-MOS inverter 344, which may be the inverter section of an RCA type CD4007A integrated circuit or a complementary pair of that same type integrated circuit with its output terminals connected together to form an inverter, by the time equivalent to the difference between the duration of the period between one positive peak 20 and one negative peak 21 and the duration of the corresponding standard NRZ signal. This time delay is established by selection of resistor 342 and capacitor 343 so that the time constant for charging to the switching voltage of inverter 344, when the signal transition on lead 341 is negative to positive, provides the necessary delay. The value of resistor 342 can be adjusted to accommodate variations between inverters 34. Diode 345, which may be type IN914, permits current to bypass the resistor 342 when the signal transition on lead 341 is from positive to negative and substantially reduces the time constant in that case. Transistors 346 and 347, which may be type 2N4403 transistors, are connected by a Darlington pair in which the signal at the collector of transistor 347 is switched either to −5V potential or effectively shorted to the emitter. The collector and emitter of transistor 347 are connected to the input terminals of the teletypewriter, with the emitter connected to the teletypewriter's neutral terminal.

Typical values for the resistors of the circuit of FIG. 11 are:

312 — 3,000 ohms
313 — 3,000 ohms
314 — 2,000 ohms
315 — 5 ohms
324 — 2,000 ohms
325 — 0 to 2,000 ohms
326 — 2,000 ohms
327 — 0 to 2,000 ohms
348 — 33,000 ohms
349 — 4,000 ohms It will be understood by those skilled in the art that a number of modifications may be made without departing from the scope of the present invention. For example, the number of wires in the recording head and their spacing may be varied depending upon the desired number of bits per word or to provide for parallel recording of several words.

Various known means may be employed to protect the recording conductors from abrasive wear by the recording medium.

While much of the foregoing disclosure has employed as its example of a magnetic medium, a magnetic recording tape with its length perpendicular to the conductors of the recording head, the recording head of the present invention can also be used with its conductors parallel to the length of such a tape (in which case play-back can be accomplished with a multichannel playback head or with a playback head moved perpendicular to the tape length), as well as with other magnetic media such as cards, discs, drums and wires which can be positioned in proximity to the recording head.

I claim:

1. Apparatus for recording data on a cooperating magnetic recording medium comprising:
    a plurality of electrical conductors with a single segment of each of the conductors mounted in parallel positional relationship to corresponding segments of the other conductors with each segment in proximity to the magnetic recording medium;
    switching means for connecting selected conductors in a single series circuit; and
    means for energizing the segments of the selected conductors and thereby recording data on the magnetic medium by passing current in the form of a single short duration, high peak current pulse through the selected conductors in series;
    said energizing means comprises a capacitor and means for rapidly discharging said capacitor.

2. Apparatus for recording data on magnetic tape comprising:
    a plurality of electrical conductors with a single segment of each of the conductors mounted in parallel positional relationship to corresponding segments of the other conductors with each segment in proximity to the magnetic tape;
    switching means for selectively connecting each of the conductors into a single series circuit or bypassing it through an alternative resistance having substantially the same resistance as the conductor with which it is associated; and capacitor discharge means for energizing the segments of the conductors connected in the series circuit and thereby recording data on the magnetic tape by passing current in the form of a short duration, high peak current pulse through said series circuit.

3. Apparatus for recording data on a cooperating magnetic recording medium comprising:
   a non-conductive, non-magnetic unitary conductor mounting member;
   a plurality of electrical conductors each having a single segment affixed to said mounting member and arrayed along a line; and
   means for selectively energizing the conductor segments by supplying a single short duration high peak current pulse to selected conductors to substantially simultaneously record a pattern representative of a group of data bits onto the magnetic medium upon passage of the pulse through the selected conductor segments, said means comprising switching means for selectively connecting conductors in a series circuit to which said pulse is applied;
   in which the magnetic medium and the array of conductor segments are relatively movable along said line;
   the single segment of each of the conductors is in proximity to the magnetic medium; and
   there is only one conductor segment for each of the data bits in said group.

4. The apparatus of claim 3 wherein said conductor segments extend in a direction substantially transverse to said line.

5. The apparatus of claim 3 wherein there are no magnetic pole pieces adjacent said conductors.

6. The apparatus of claim 3 wherein each of the switching means includes a resistor which may be connected in the series circuit to bypass a conductor, the resistor having substantially the same resistance as the conductor with which it is associated.

7. Apparatus for recording data on a cooperating magnetic recording medium comprising:
   a non-conductive,, non-magnetic, unitary conductor mounting member;
   a plurality of electrical conductors each having a single segment affixed to said mounting member and arrayed along a line; and
   means for selectively energizing the conductors segments by supplying a short duration high peak current pulse to selected conductors to substantially simultaneously record a pattern representative of a group of data bits onto the magnetic medium upon passage of the pulse through the selected conductor segments, said means comprising a capacitor, means for rapidly ischarging said capacitor, and a circuit for directing said pulse through two or more conductors in series, said circuit including at least one resistor arranged to provide substantially constant circuit resistance regardless of which combination of conductors is selected;
   in which the magnetic medium and the array of conductor segments are relatively movealbe along said line;
   the single segment of each of the conductors is in proximity to the magnetic medium; and
   there is only one conductor segment for each of the data bits in said group.

8. The apparatus of claim 7 wherein each of said condutors has substantially the same cross-section and the spacings between adjacent conductors of a group of at least three conductors is substantially equal.

9. Method for recording data on a magnetic recording medium comprising the steps of:
   positioning an array of electrical conductors with a single segment of each of said conductors in a line which is parallel and adjacent to the surface of the magnetic medium, the segments extending in a direction substantially transverse to said line;
   selectively energizing the conductor segments by causing a single short duration high peak current pulse to pass from a capacitor through a series circuit comprising selected conductors and alternate conducting means bypassing non-selected conductors, to substantially simultaneously record a pattern representative of a group of data bits onto the magnetic medium upon passage of the pulse through the conductor segments; and
   relatively moving the magnetic medium and the conductor array along said line.

10. The method of claim 9 including the step of prerecording a periodic waveform on the magnetic medium.

11. Method for recording data on a magnetic recording medium comprising the steps of:
    positioning an array of electrical conductors with a single segment of each of said conductors in a line which is parallel and adjacent to the surface of the magnetic medium, the segments extending in a direction substantially transverse to said line, wherein said array comprises at least three substantially equally spaced conductors;
    selectively energizing the conductor segments by causing a single short duration high peak current pulse to pass from a capacitor through a series circuit comprising selected conductors and alternate conducting means bypassing non-selected conductors, to substantially simultaneously record a pattern representative of a group of data bits onto the magnetic medium upon passage of the pulse through the conductor segments, wherein the current used to energize said array is sufficient to cause substantial saturation of the region of the magnetic medium proximate and between two adjacent conductors when said two conductors have been energized but not sufficient to cause saturation of a region proximate an unenergized conductor in the midst of the three conductors when the conductors on either side of said unenergized conductor have been energized; and
    relatively moving the magnetic medium and the conductor array along said line.

* * * * *

UNITED STATES PATENT AND TRADEMARK OFFICE
CERTIFICATE OF CORRECTION

PATENT NO. : 4,019,206

DATED : April 19, 1977

INVENTOR(S) : Peter Haas

It is certified that error appears in the above-identified patent and that said Letters Patent are hereby corrected as shown below:

Col. 2, line 64, "shon" should be --shown--.

Col. 9, line 56, "ischarging" should be --discharging--.

Col. 10, line 2, "movealbe" should be --movable--.

Signed and Sealed this thirtieth Day of August 1977

[SEAL]

Attest:

RUTH C. MASON
Attesting Officer

C. MARSHALL DANN
Commissioner of Patents and Trademarks